United States Patent [19]

Jacobs

[11]  4,000,115
[45]  Dec. 28, 1976

[54] PHOTOPOLYMERIZATION OF EPOXIDES

[75] Inventor: Sanford S. Jacobs, Watchung, N.J.

[73] Assignee: American Can Company, Greenwich, Conn.

[22] Filed: Apr. 18, 1975

[21] Appl. No.: 569,161

[52] U.S. Cl. .............................. 260/47 EP; 96/67; 96/115 P; 204/159.11; 204/159.14; 260/2 A; 260/2 EP; 260/59 EP; 526/273

[51] Int. Cl.$^2$ ...................................... C08G 30/04

[58] Field of Search ............ 260/2 EP, 47 EP, 2 A, 260/88.3 A, 18 PF, 59; 204/159.11

[56] References Cited

UNITED STATES PATENTS 3,829,369   8/1974   Feinberg .................... 260/47 EP X
3,835,003   9/1974   Schlesinger ................ 260/47 EP X

*Primary Examiner*—Theodore E. Pertilla
*Attorney, Agent, or Firm*—Robert P. Auber; Ernestine C. Bartlett; Ira S. Dorman

[57]     ABSTRACT

The useful pot life of epoxide compositions containing a phenyldiazonium hexafluorophosphate as a latent polymerization catalyst is appreciably extended when the diazonium compound contains one or more alkoxy or benzyloxy radicals as substituents on the phenyl radical. The substituents are preferably located on carbon atoms that are ortho or para with respect to the carbon atom bearing the diazonium radical.

4 Claims, 2 Drawing Figures

VISCOSITY CONTROL IN CATALYZED CYCLOALIPHATIC EPOXIDE

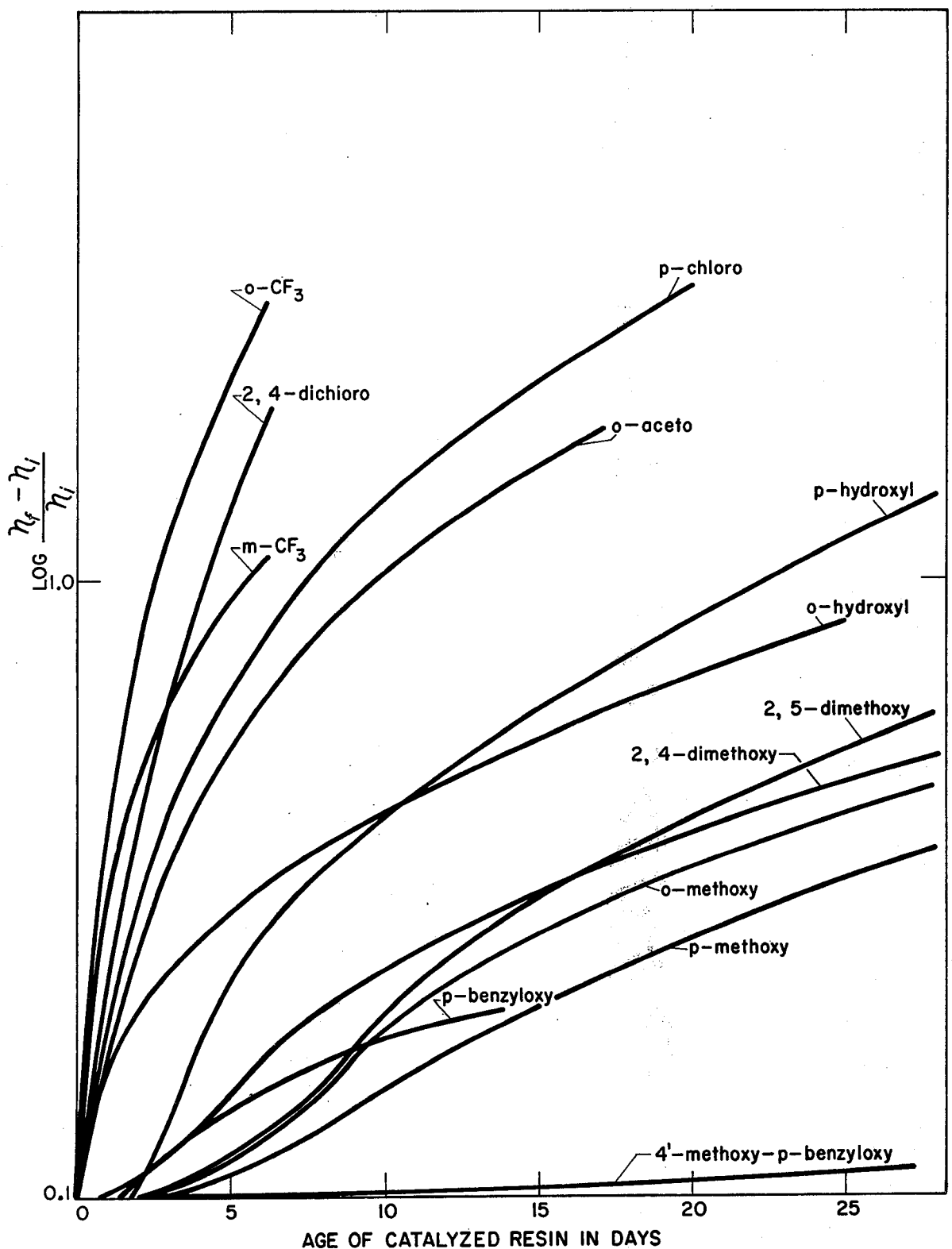

PHOTOPOLYMERIZATION OF EPOXIDES

BACKGROUND

This invention relates to photopolymerizable epoxide compositions. This invention further relates to extending the useful pot life of epoxide compositions containing a latent, photosensitive catalyst.

The polymerization of epoxides by means of Lewis acids generated by the photoinduced decomposition of specified diazonium salts is taught in U.S. Pat. No. 3,708,296. The patent discloses a large number of diazonium complexes containing precursors of various Lewis acids including phosphorous pentafluoride antimony pentafluoride antimony pentachloride and ferric chloride. The diazonium compounds react in the presence of radiation of specific wavelengths in accordance with the following equation:

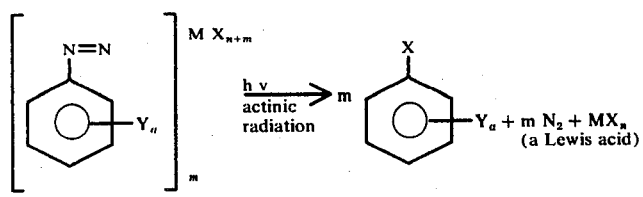

The result Lewis acid $MX_n$ initiates a polymerization of the epoxide compound. In the foregoing equation M represents a metallic element and X represents fluorine or chlorine.

Certain diazonium complexes disclosed in the aforementioned U.S. Pat. No. 3,708,296 are less than satisfactory in that epoxides containing these catalysts undergo a gradual spontaneous polymerization even when virtually all light is excluded. In some instances this polymerization is sufficiently rapid that the catalyst and epoxide cannot be combined until just prior to exposure of the mixture to the radiation intended to polymerize the epoxide. In many instances it is desirable to store larger quantities of a catalyzed epoxide for extended periods of time which may be as much as several days, to avoid the necessity of blending small quantities as needed. The tendency of some catalysts to decompose prematurely therefore may be a considerable shortcoming.

While it may be possible to stabilize the epoxide-catalyst mixture, by the use of certain additives, these additives may interfere with the desired photoinitiated polymerization in addition to increasing the cost of the formulation.

It is therefore an objective of this invention to provide aryldiazonium complexes of Lewis acids that can be incorporated into epoxide compositions that have considerable pot life in that the mixture of epoxide and catalyst can be kept for extended periods of time prior to being used.

It has now been found that the presence of certain substituents on the phenyl ring of a phenyl diazonium hexafluorophosphate significantly increases the stability of the diazonium compound in the absence of light without substantially affecting the efficacy of the compound as a photoinitiator for the polymerization of epoxides as described in U.S. Pat. No. 3,703,296.

SUMMARY OF THE INVENTION

This invention provides a method for improving the resistance to spontaneous polymerization in the absence of light of epoxy monomers containing a latent, photosensitive catalyst of the general formula:

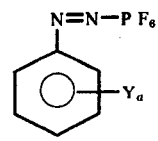

wherein a is the integer 1, 2 or 3, said method comprising selecting the substituent represented by Y from the group consisting of alkoxy radicals containing between 1 and 12 carbon atoms, aralkoxy radicals and the radical

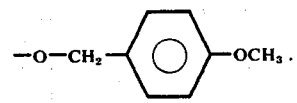

Preferably Y represents an alkoxy radical containing between 1 and 12 carbon atoms and a is 2 or 3.

BRIEF DESCRIPTION OF THE DRAWINGS

FIGS. 1 and 2 graphically represent the viscosity increase expressed as the logarithm of $$\frac{N_f - N_i}{N_i},$$

Figure 1:
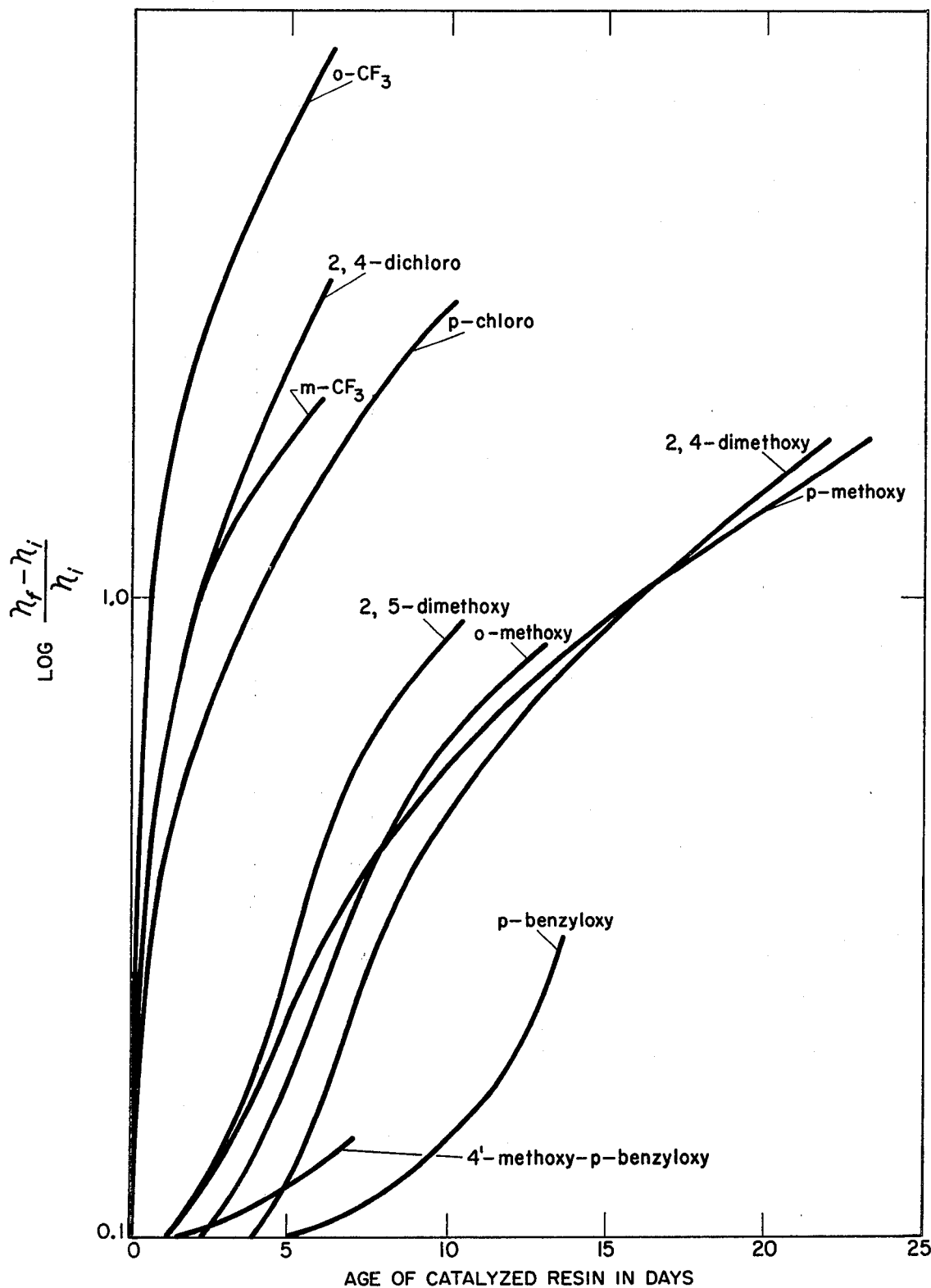

with respect to time, in days, for two epoxides containing 1% by weight, based on epoxide, of the present catalyst and several taught by the prior art. The epoxide present in the compositions represented by the curves in FIG. 1 was a cycloaliphatic epoxide, 3,4-epoxycyclohexylmethyl-3,4-epoxycyclohexane carboxylate. The data summarized in FIG. 2 is for compositions containing the diglycidyl ether of bis-phenol A. In the drawings $N_i$ and $N_f$ represent the initial and final viscosities, respectively, the latter being measured following the specified number of days. The curves are identified using the substituents present on the phenyl radical of the phenyl diazonium hexafluorophosphate. The viscosities were measured as described in the accompanying examples.

Detailed Description of the Invention

The present invention provides an improvement over the preferred diazonium complexes exemplified in the aforementioned U.S. Pat. No. 3,708,296 by defining a class of complexes that can be incorporated into epoxide compositions exhibiting a significantly reduced tendency toward non-photoinduced polymerization. The compositions can therefore be stored for extended periods of time if protected from actinic radiation, particularly of the wavelength which effects decomposition of the diazonium complex.

The present diazonium catalysts are characterized by the presence of between one and three alkoxy, aralkoxy, or p-methoxybenzyloxy

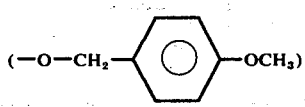

radicals on the phenyl ring of the catalyst.

Surprisingly it has been found that while epoxide compositions containing the present catalysts exhibit a relatively long pot life when compared with compositions containing many of the preferred catalysts of the prior art, the reactivity of these catalysts in the presence of ultraviolet light of the proper wavelength is the same or greater than many prior art diazonium compounds, particularly those containing chlorine as a substituent on the phenyl ring. As will be demonstrated in the accompanying examples, epoxide compositions containing these chlorinated catalysts have relatively short pot lives.

The diazonium compounds of the present invention can be prepared using procedures known in the art and such preparation forms no part of the present invention. Thus the chlorometallic complexes may be prepared for example in accordance with the method set forth by Lee et al. in Journal of the American Chemical Society, 83, 1928 (1961). Diazonium hexafluorophosphates can be prepared by diazotizing the corresponding aniline with $NOPF_6$, an $HCl-NaNO_2$ combination with subsequent addition of $HPF_6$ or a $PF^-_6$ salt, or by addition of such a hexafluorophosphate salt to another diazonium salt to effect precipitation.

The epoxy monomers which can be employed in the present invention can be defined by the following formula:

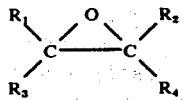

where $R_1$, $R_2$, $R_3$, and $R_4$ can be alkyl, aryl, alkoxy, alkenyl and hydrogen. Specific examples of such monomers include, but are not limited to, ethylene oxide and homologues thereof; glycidic (glycidate and glycidyl (2,3-epoxypropyl) esters; glycidyl methacrylates, acrylates and crotonates; and allyl glycidyl ethers. Additionally, commercial synthetic resins as heretofore defined can be employed. Examples of such resins can be those derived from the diglycidyl ether of bisphenol A. epoxidized polyolefins and epoxylated novolacs. Combinations of the above epoxies may be used and additionally they may be in solid or liquid forms.

A general procedure for polymerizing epoxides using the present catalysts comprises combining the epoxide, using a suitable solvent if desired, with one of the present diazonium catalysts. The resultant mixture is subsequently coated onto the desired substrate, such as a metal plate, plastic or paper. Any solvents which may be present are evaporated, following which the coated substrate is exposed to ultraviolet light. If it is desired to form an image on the substrate, a suitable mask or negative is placed between the light source and the substrate. In the presence of ultraviolet light the diazonium compound decomposes to yield a Lewis acid, which initiates polymerization of the epoxide. The resultant polymer is resistant to most chemicals and organic solvents. If portions of the substrate were not exposed to the light source, the unpolymerized epoxide in these areas can readily be removed using suitable solvents to form an image on the substrate.

Suitable solvents for preparing the epoxide-catalyst mixture include those which do not react with either component before the mixture is exposed to actinic radiation. Examples of such solvents include, acetone, acetonitrile, butyronitrile, benzonitrile, toluene, xylene, methyl ethyl ketone, Cellosolve ether, monochlorobenzene, tetrachloroethane, o-dichlorobenzene, tetrahydrothiophene-1,1-dioxide (sulfolane) and propylene carbonate. Mixtures of these solvents have been found useful in the present invention. Furthermore, a liquid epoxy may serve as solvent for another epoxy, liquid or solid in nature. It is to be understood, however, that the use of solvents is not mandatory in carrying out the present invention if the catalyst is soluble in the epoxide.

The amount of photosensitive compound employed in the admixture need not be specifically ascertained but is generally related to the amount of epoxy monomer being polymerized. It has been found that quite satisfactory results are obtained by using from about 0.5 to about ten parts by weight of aryldiazonium compound to each one hundred parts by weight of the epoxy monomer.

The epoxide polymers produced by the method of the present invention are useful in a wide variety of applications in the field of graphic arts due to their superior abrasion resistance and adhesion to rigid, resilient, and flexible substrates such as metal, plastic, rubber, glass, paper, wood and ceramics; excellent resistance to most solvents and chemicals; and capability of forming high resolution images. In certain instances the polymerized epoxy monomer itself may serve as the substrate. Among such uses are in making acid and alkali resist images for chemical milling, gravure images, offset plates, flexographic printing, screenless lithography, printing plates, stencil making, microimages for printed circuitry, thermoset vesicular images, microimages for information storage, decoration of paper, glass, and metal packages and light cured coatings.

The source of actinic radiation in carrying out the present invention can be any suitable source as that produced from a mercury, xenon, carbon arc or tungsten filament lamp. The only limitations placed on the type of instrumentation used is that it must have a frequency range and energy level sufficient to impart to the monomer system energy at a high enough intensity to reach the decomposition level of the photosensitive compounds.

Synthesis of Aryl Diazonium Hexafluorophosphates
4'-methoxy-p-benzyloxy diazonium hexafluorophosphate
Amine Synthesis 69 g., 0.5M of anisyl alcohol was stirred with 124 cc. of 37% HCl (2-fold excess) for 15 minutes. The two phases that formed were split in a separatory funnel and the lower anisyl chloride phase was dried over anhydrous sodium sulfate. Filtration yielded 71 g., 0.45M of dry, oily, anisyl chloride (I).

55 g., 0.5M of p-aminophenol was dissolved in 200 cc. of dimethyl sulfoxide. 56 g., 1.0M of powdered potassium hydroxide was added to the DMSO solution causing a considerable exotherm and further darkening. The solution was stirred for an additional hour during which time the temperature was lowered from about 40° C to 10° C to minimize side reactions. The temperature was then raised to 80° C and the dry anisyl chloride (I) added dropwise, causing a considerable exotherm reaction. Stirring was continued for an additional 2 hours at a temperature of 90°–100° C. The solution was then cooled to 25° C and 400 cc. of 1.0N aqueous sodium hydroxide added, causing an immediate formation of a light brown solid. Stirring was continued for an additional 10 minutes, the solution filtered and the solid washed twice with small amounts of hot water and once with cold ethanol. The product was dried to constant weight at 25° C, yielding 91 g., (80% yield), of a tan powder, M.P. 106°–108° C (II).

46 g. of II were dissolved in 500 cc. carbon tetrachloride at 90°–100° C. A 4 g. portion of decolorizing charcoal was then added, stirring was continued for 10 minutes and the product filtered. The recrystallized product was washed with small amounts of cold carbon tetrachloride and hexane and then dried to constant weight at 25° C, yielding 32 g., of a light tan powder melting between 114.5° and 115.5° C (III).

Analysis for III:

CH$_3$O—⟨○⟩—CH$_2$O—⟨○⟩—NH$_2$

|   | Calculated | Found |
|---|---|---|
| C | 73.4 | 73.2 |
| H | 6.6 | 6.4 |
| N | 6.1 | 5.8 |

Diazonium Salt Synthesis
(4'-methoxy-p-benzyloxy)phenyl diazonium hexafluorophosphate 22.9 g., 0.1M of III was suspended in 200 cc. of 6N aqueous hydrochloric acid with vigorous stirring at 0°–5° C. A 7 g., 0.1M portion of sodium nitrite in 20 cc. of water was added dropwise causing a slight exotherm. When addition was complete, the diazonium chloride solution was filtered directly onto a solution of 16.3 g., 0.1M of ammonium hexafluorophosphate in 20 cc. of water. The yellow, solid, phenyl diazonium hexafluorophosphate precipitated immediately (IV). An additional 500 cc. of water was added to increase the mobility of the slurry. After stirring for 10 minutes IV was filtered, washed chloride-free with water, once with methanol and dried to constant weight at 25° C. The yield was 28 g., 74%, of a pale yellow solid. M.P. 120°–123° C. 25 g. of dry IV was dissolved in 40 g. of acetonitrile, 3 g. of decolorizing charcoal added, the solution stirred for 10 minutes and then filtered directly into 650 cc. of diethyl ether at 5° C. The white powdery product was dried to constant weight, yielding 19 g. of product (V) melting between 116° and 118° C.

Analysis for V:

OCH$_3$
|
⟨○⟩
|
CH$_2$
|
O
|
⟨○⟩
|
N$_2^+$PF$_6^-$

|   | Calculated | Found |
|---|---|---|
| C | 43.5 | 42.6 |
| H | 3.4 | 3.4 |
| N | 7.3 | 7.3 |
| P | 8.0 | 8.1 | p-methoxyphenyldiazonium hexafluorophosphate 1440 cc. of 5N aqueous hydrochloric acid was charged into a 3000 cc. capacity vessel equipped with a stirrer, thermometer, condenser and addition funnel. 184.5 g. (1.5M) of p-anisidine was added and the mixture stirred at room temperature until complete conversion to the ammonium salt was achieved. The solution was cooled in an ice-methanol bath to −5° C. Diazotization was achieved by adding 184.5 g. (1.52M) of sodium nitrite in 300 ml of water dropwise over a 30-minute period while maintaining the temperature between 0°–5° C. A solution of 244.5 g. (1.5M) of ammonium hexafluorophosphate in 300 ml of water was added to precipitate the hexafluorophosphate salt. The salt was filtered, washed chloride-free and vacuum-dried at 25° C.

Yield - 400 g. of dried product
Melting Range - 143–145° C.
Analysis:
| | | | | |
|---|---|---|---|---|
| Calculated | - C-30.0%, | H-2.5%, | N-10.0%, | P-11.1% |
| Found | - C-30.2%, | H-2.2%, | N-10.1%, | P-11.4% |

The following diazonium salts were all made by the procedure given above for p-methoxyphenyldiazonium hexafluorophosphate.

o-methoxyphenyl diazonium hexafluorophosphate
From o-anisidine

Analysis:
| | | | | |
|---|---|---|---|---|
| Calculated | - C-30.0%, | H-2.5%, | N-10.0%, | P-11.1% |
| Found | - C-29.7%, | H-2.3%, | N- 9.9%, | P-11.1% | p-benzyloxyphenyl diazonium hexafluorophosphate
From p-benzyloxy aniline

| Analysis: | | | | |
|---|---|---|---|---|
| Calculated | -C-44.1%, | H-3.1%, | N- 9.9%, | P-10.9% |
| Found | -C-25.4%, | H-1.2%, | N-10.1%, | P-11.1% | o-chlorophenyl diazonium hexafluorophosphate
From o-chloro aniline

| Analysis: | | | | |
|---|---|---|---|---|
| Calculated | -C-25.3%, | H-1.4%, | N- 9.9%, | P-10.9% |
| Found | -C-25.4%, | H-1.2%, | N-10.1%, | P-11.1% | m-α,α,α-trifluoromethyl benzene diazonium hexafluorophosphate
From m-α,α,α-trifluoromethyl aniline

| Analysis: | | | | |
|---|---|---|---|---|
| Calculated | -C-26.4%, | H-1.3%, | N-8.8%, | P-9.7% |
| Found | -C-26.1%, | H-1.4%, | N-8.8%, | P-9.3% | o-α,α,α-trifluoromethyl benzene diazonium hexafluorophosphate
From o-α,α,α-trifluoromethyl aniline

| Analysis: | | | | |
|---|---|---|---|---|
| Calculated | -C-26.4%, | H-1.3%, | N-8.8%, | P-9.7% |
| Found | -C-25.2%, | H-1.2%, | N-8.6%, | P-9.5% |

2,5-dimethoxy benzene diazonium hexafluorophosphate
From 2,5-dimethoxy aniline

| Analysis: | | | | |
|---|---|---|---|---|
| Calculated | -C-31.0%, | H-2.9%, | N-9.0%, | P-10.0% |
| Found | -C-26.4%, | H-2.8%, | N-9.8%, | P- 9.0% |

2,4-dichloro benzene diazonium hexafluorophosphate
From 2,4-dichloro aniline

| Analysis: | | | | |
|---|---|---|---|---|
| Calculated | -C-22.6%, | H-1.0%, | N-9.7%, | P-8.8% |
| Found | -C-21.0%, | H-1.2%, | N-9.0%, | P-9.0% | p-chlorophenyl diazonium hexafluorophosphate
From p-chloro aniline

| Analysis: | | |
|---|---|---|
| Calculated | - N- 9.8%, | P-10.9% |
| Found | - N-10.3%, | P-10.4% | o-acetylphenyl diazonium hexafluorophosphate
From o-amino acetophenone

| Analysis: | | | | |
|---|---|---|---|---|
| Calculated | -C-32.9%, | H-2.4%, | N-9.6%, | P-10.6% |
| Found | -C-32.5%, | H-2.2%, | N-9.4%, | P-10.6% | p-hydroxyphenyl diazonium hexafluorophosphate
From p-hydroxy aniline

| Analysis: | | | | |
|---|---|---|---|---|
| Calculated | -C-27.1%, | H-1.7%, | N-10.6%, | P-11.5% |
| Found | -C-27.9%, | H-1.6%, | N-10.8%, | P-11.4% |

2,4-dimethoxyphenyl diazonium hexafluorophosphate
From 2,4-dimethoxy aniline

| Analysis: | | | | |
|---|---|---|---|---|
| Calculated | -C-31.0%, | H-2.9%, | N-9.0%, | P-10.0% |
| Found | -C-29.5%, | H-2.7%, | N-8.9%, | P-10.2% |

2-methyl mercapto phenyl diazonium hexafluorophosphate
From 2-methylthio aniline

| Analysis: | | |
|---|---|---|
| Calculated | - S-11.9%, | P-11.6% |
| Found | - S-11.1%, | P-10.0% |

3-methyl mercapto phenyl diazonium hexafluorophosphate
From 3-methylthio aniline

| Analysis: | | |
|---|---|---|
| Calculated | - S-11.9%, | P-11.6% |
| Found | - S-11.2%, | P-10.1% |

The following examples demonstrate the increase in pot life that can be obtained using the present catalysts relative to the preferred species of the prior art. The examples should not be interpreted as limiting the scope of the invention defined in the accompanying claims.

EXAMPLE 1

The effectiveness of variously substituted phenyldiazonium hexafluorophosphates as initiators for the photopolymerization of epoxides was evaluated by preparing a 33% by weight solution of each catalyst in acetonitrile and using these solutions at a concentration of 3% to initiate the photopolymerization of a diglycidyl ether of bis-phenol A (Epoxide 6004, manufactured by Ciba-Geigy Corporation) and a cycloaliphatic diepoxide, 3,4-epoxy cyclohexylmethyl-3,4-epoxy cyclohexane carboxylate. The resultant mixtures were stored under yellow light for specified periods of time to avoid a photoinduced decomposition of the catalyst. The viscosity of the solutions were measured periodically using a Haake Rotovisco viscometer equipped with a plate and cone attachment.

The catalyzed solutions were coated onto a metal plate using a wire-wound rod and exposed to radiation from a 360 watt ultraviolet lamp. The level of radiation (in Joules/cm$^2$) was measured. The viscosity data obtained from the evaluation are summarized in the accompanying drawings. The catalysts are identified by means of the substituents present on the phenyl ring. The location of single substituents are specified as being ortho (o), meta (m), or para (p) with respect to the diazonium radical. If more than one substituent is present, the carbon atoms of the ring are sequentially numbered beginning with the carbon atom to which the diazonium radical is bonded.

All of the compositions tested polymerized to a dry, tack-free coating when exposed to an amount of radiation equivalent to between 2.4 and 22 Joules/cm².

The viscosity data in the accompanying two graphs (FIGS. 1 and 2) demonstrate the superior pot life of epoxide compositions containing the present catalysts. In compositions containing the diglycidyl ether of bisphenol A, the greatest viscosity increase exhibited by the present catalysts was equal to 5 times the original value after 25 days. Following the same period of time, compositions containing the preferred prior art catalysts increased at least 8 times. The least stable composition exhibited a 10-fold viscosity increase after only 2 days.

What is claimed is:

1. A method for improving the pot life of polymerizable vicinal epoxide compositions containing a latent, photosensitive catalyst of the general formula

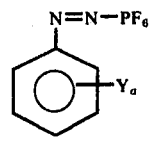

wherein a is the integer 2 or 3, said method comprising selecting the substituent represented by Y from the group consisting of alkoxy radicals containing between 1 and 12 carbon atoms, a benzyloxy radical and methoxy substituted benzyloxy radicals.

2. A method for extending the pot life of polymerizable epoxide compositions as defined in Claim 1 wherein each Y represents a methoxy radical, located ortho or para with respect to the diazonium radical.

3. A method for extending the pot life of polymerizable epoxide compositions as described in Claim 1 wherein Y represents a benzyloxy radical or a methoxy-substituted benzyloxy radical.

4. A method for extending the pot life of polymerizable epoxide compositions as described in Claim 1 wherein the epoxide composition contains an inert solvent for said catalyst.

* * * * *